March 26, 1935. H. G. STOKKE ET AL 1,995,758
TRACTION DEVICE FOR THE WHEELS OF AUTOMOTIVE VEHICLES
Filed May 16, 1934 2 Sheets-Sheet 1
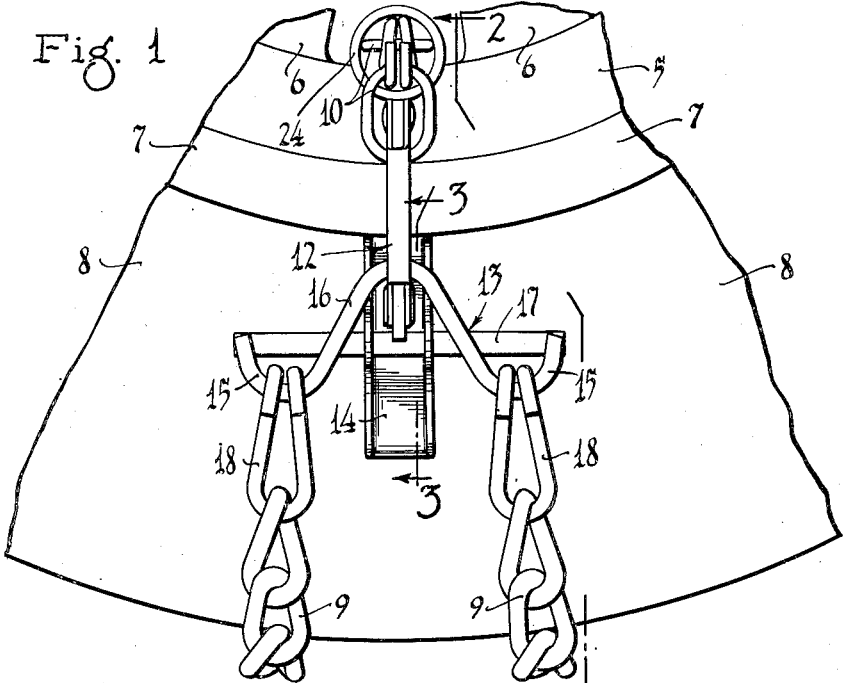
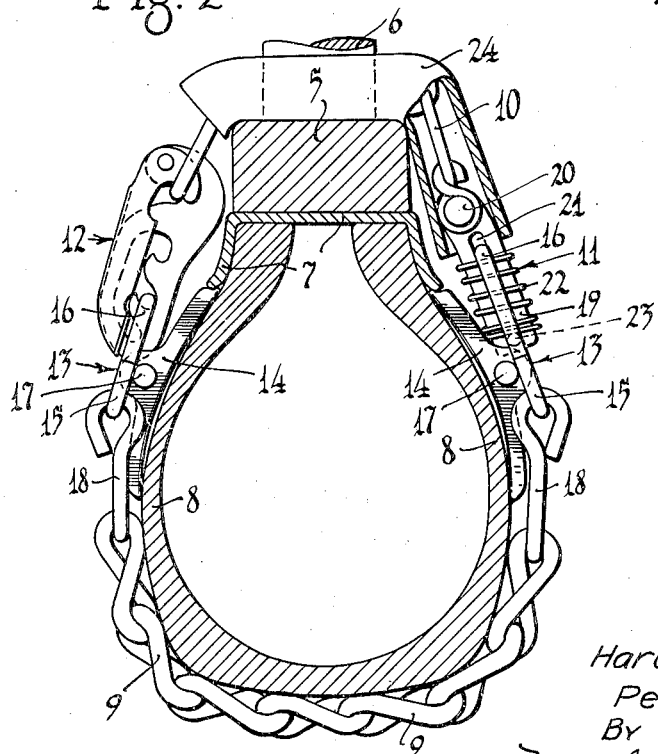
INVENTORS
Harold G. Stokke
Peter Worner
BY THEIR ATTORNEYS

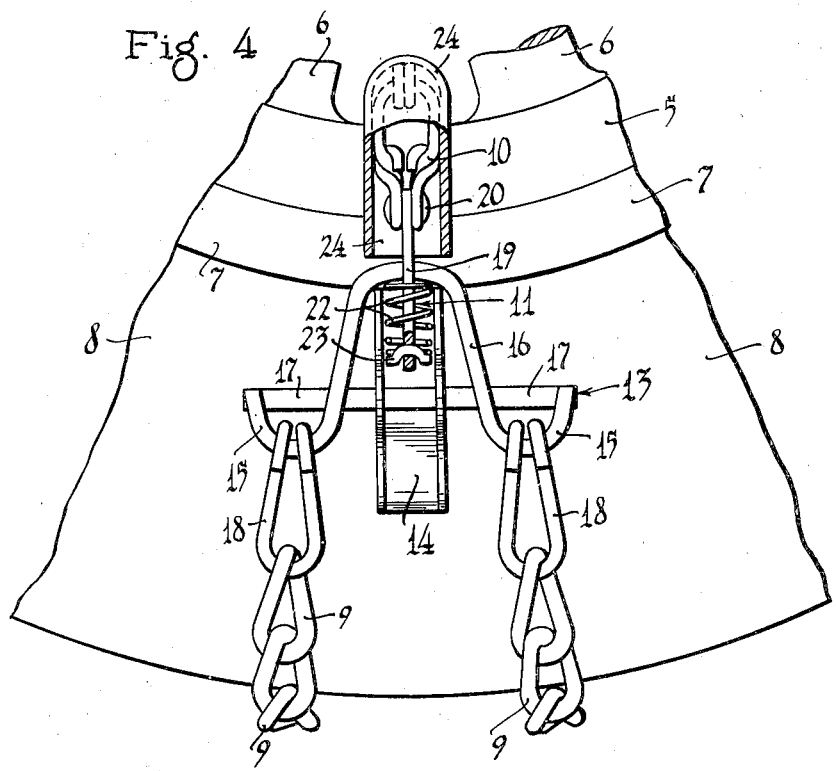
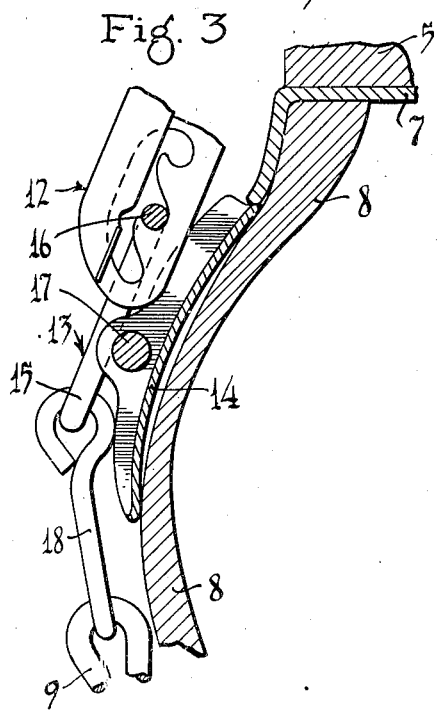

Patented Mar. 26, 1935

1,995,758

UNITED STATES PATENT OFFICE 1,995,758

TRACTION DEVICE FOR THE WHEELS OF AUTOMOTIVE VEHICLES

Harold G. Stokke and Peter Worner, Winona, Minn., assignors to Peerless Chain Company, Winona, Minn., a corporation of Minnesota Application May 16, 1934, Serial No. 725,922

18 Claims. (Cl. 152—14)

This invention relates to traction devices for the wheels of automotive vehicles and is in the nature of an improvement on or a refinement of the invention disclosed and broadly claimed in the application of Dominic C. Bambenek, "Traction device for the wheels of automotive vehicles", filed January 31, 1934, under Serial Number 709,154, and the application of Joseph B. Bambenek, "Combined connector and anti-chafing bearing for tire chains", filed February 19, 1934 under Serial Number 711,939.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary outside elevation of an automobile wheel equipped with a pneumatic tire and having one of the improved traction devices applied thereto;

Fig. 2 is a view partly in elevation and partly in section taken on the irregular line 2—2 of Fig. 1;

Fig. 3 is a fragmentary detail view with some parts sectioned on the line 3—3 of Fig. 1, on an enlarged scale; and Fig. 4 is a view corresponding to Fig. 1 but looking at the parts from the inside of the wheel.

The automobile wheel illustrated includes a felly 5, spokes 6, a rim 7 and on which rim is mounted the casing 8 of a pneumatic tire.

Applied to the wheel is one of the improved traction devices which includes a pair of tread members or chains 9, a cross-tie member or chain 10, a tension device 11, a lock device 12, a pair of connectors 13, and a pair of bearings 14. From a broad viewpoint the tension device 11, the lock device 12 and the cross-tie chain 10, form a cross-tie connection for the tread chains 9.

Each connector 13, as shown, includes a pair of yokes 15 and an intermediate yoke 16 in substantially the same plane and formed from a single round rod. The yokes 15 and 16 extend in opposite directions, the one from the other, with their arms projecting inwardly. Extending transversely of each connector 13 is a round rod 17 that is rigidly secured to the arms of the yokes 15 and 16 by welding or otherwise. The tread chains 9 are attached at their ends to the yokes 15 by hook-like links 18 and which yokes hold said chains parallel and laterally spaced, the one from the other.

The tension device 11 permanently connects the cross-tie chain 10 at one end to the yoke 16 of one of the connectors 13 and the lock device 12 detachably and adjustably connects the cross-tie chain 10 at its other end to the yoke 16 of the other connector 13.

The tension device 11, as shown, includes a flat link 19, one end of which extends between the sides of the link at the respective end of the cross-tie chain 10 and is secured thereto by a headed pivoted pin 20. Formed in the link 19 is an intermediate longitudinally extended slot 21 through which the transverse portion of the respective yoke 16 extends and connects said link thereto for compound endwise sliding and pivotal movements. It may be here stated that the link 19 and connected yoke 16 form a slip connection which, as shown, is between the cross-tie chain 10 and the respective connector 13. Encircling the outer end portion of the link 19 is a coiled compression spring 22 yieldingly held between the transverse portion of the yoke 16 and a T-head 23 on the outer end of said link.

The lock device 12 extends through the respective yoke 16 and one of the links forming the outer end portion of the cross-tie chain 10. This lock device 12 when closing has a lever action that draws the cross-tie chain 10 endwise toward said device and places the spring 22 under compression.

Obviously, the tenion device 11 yieldingly holds the traction device drawn around the rim 5 and tire casing 8. The cross-tie chain 10 extends through a piece of hose 24 which prevents said chain from marring the rim 5.

The lock device 12 is disclosed and broadly claimed in United States Letters Patent "Combined slack take-up and lock device for tire chains", No. 1,928,474, issued September 26, 1933, to Joseph B. Bambenek.

The parts thus far described are shown and fully described and broadly claimed in the application heretofore identified.

Referring now in detail to the bearings 14 which are the subject matter of the present application. These bearings 14 are channel-shaped in cross-section and intermediately pivoted to the rods 17 which extend through aligned holes in the sides of said bearings. Said bearings 14 are located between the arms of the yokes 16 in longitudinal alignment with the cross-tie chain 10. It is important to note that the backs or inner surfaces of the bearings 14 are curved from one end to the other and the curvature thereof is much sharper than the curved side walls of the tire casing 8 with which said bearings engage only at their ends. The bearings 14 at their inner ends engage the outer edges of the side flanges of the wheel rim 7 for a highly important reason, to wit: to hold the traction device against circumferential shifting movement about the tire casing 8. As the bearings 14 between their ends are out of engagement with the sides of the tire casing 8, the outward pressure of said casing on the outer ends of the bearings 14 tends to move said bearings pivotally on the rods 17 and thereby move their inner ends inwardly so that they are always securely held on the wheel rim 7 and react, the one against the other, to hold the traction device against circumferential shifting movement transversely about the tire casing 8.

It is well known that side sway or lateral movement of a travelling vehicle, and particularly when the vehicle is travelling on a curve, tends to shift traction devices, of the type shown in the drawings, transversely around a tire. The necessity of holding a traction device of this type against circumferential movement transversely around the tire is to prevent either the tension device 11 or the lock device 12 from shifting into a position on the tread of the tire casing 8 where the same will be constantly run over by the tire when on a road bed and thereby mutilate it. This mutilation of either of the devices 11 or 12 will cause the same to open up and allow the traction devices to be thrown from the wheel and lost.

As previously stated, the tension device 11 is under tension at all times and tends to draw the tread chains 9, at their ends, inwardly and thereby holds the inner ends of the bearings 14 on the wheel rim 7. The two devices 11 and 12 extend between the side flanges of the bearings 14 at the inner sections of said device and thereby make a very neat and compact structure.

Again referring to Figs. 2 and 3, it will be noted that the bearings 14 are between the traction device and the sides of the tire casing 8 and thereby hold the links 18, the connectors 13, the tension device 11, and the lock device 12 out of contact with said casing, thus relieving the same from wear.

It is evident that during flexing of the tire casing 8 the bearings will freely move pivotally on the rods 17 and at the same time retain a constant relation to said casing and the wheel rim 7.

From what has been said, it will be understood that the traction device described is capable of modifications as to details of construction and arrangement within the scope of the invention herein disclosed and claimed.

The tread chains and cross-tie members constitute endless shackles adapted to surround a wheel rim and tire applied thereto. The bearing members 14 are extended in planes that transversely intersect the wheel rim and tire and are so arranged, and intermediately pivoted to the shackle, that both ends of each bearing member are held in engagement with the exterior of the tire. This arrangement insures engagement of the inner ends of the bearing members with the wheel rim, in case there is a shifting or drifting of the tread chains transversely of the tire. The faces of the bearing members are made concave so that regardless of varying diameters of tires, their inner and outer ends will always engage the tire.

What is claimed is:

1. A pair of tire engaging bearing members intermediately pivoted one to each side of a traction device constructed and arranged to be placed transversely around a wheel rim and a tire mounted thereon, said bearing members being operable to hold the connected portions of the traction device out of contact with the tire.

2. The structure defined in claim 1 in which the bearing members at their outer ends are arranged to engage the wheel rim on opposite sides of the tire and hold the traction device against movement transversely around the tire.

3. The structure defined in claim 1 in which the bearing members intermediate of their ends are outwardly spaced from the tire.

4. A pair of connectors connecting a pair of tread members to a cross-tie member with the tread members edgewise spaced apart and with the cross-tie member midway between the tread members, and a pair of tire-engaging bearing members intermediately pivoted to the connectors, said tread members and the cross-tie members being constructed and arranged to be placed transversely around a wheel and a tire mounted thereon with the bearing members at their outer ends engageable with the wheel rim on opposite sides of the tire for holding the tread member against transverse movement around the tire.

5. The structure defined in claim 4 in which the backs of the bearing members are curved outwardly from one end to the other and on a sharper curve than the curved sides of the tire.

6. The structure defined in claim 4 in which the bearing members are channel-shaped in cross-section with the sides thereof extending outwardly, and in which structure the pivots of said bearing members are on the sides thereof.

7. A pair of connectors connecting a pair of tread members to a cross-tie member with the tread members edgewise spaced apart and with the cross-tie member midway between the tread members, and a pair of channeled tire-engaging bearing members extending longitudinally between the tread members and intermediately pivoted at their sides to the connectors, said tread members and cross-tie member being constructed and arranged to be placed transversely around a wheel rim and a tire mounted thereon with the bearing members at their outer ends engageable with the wheel rim on opposite sides of the tire for holding the tread members against transverse movement around the tire.

8. A pair of connectors connecting a pair of tread members to a cross-tie member, each connector comprising a rod bent to form two end yokes and an intermediate yoke, the tread members being attached to the end yokes and the cross-tie member being attached to the intermediate yokes, a pair of rods extending transversely of the arms of the yokes and connecting the arms of the yokes of each connector, and a pair of tire-engaging bearing members intermediately pivoted one to each rod, said tread and cross-tie members being constructed and arranged to be placed transversely around a wheel rim and a tire mounted thereon with the bearing members at their inner ends engaging the wheel rim on opposite sides of the tire for holding the tread members against transverse movement around the tire, said bearing members also holding the connectors spaced outwardly of the tire.

9. The structure defined in claim 8 in which the bearing members between the ends thereof are spaced outwardly from the tire.

10. The structure defined in claim 8 in which the bearing members are channel-shaped in cross-section and in which structure the rods extend through holes in the sides of the bearing members.

11. The structure defined in claim 4 in which the bearing members hold the connectors spaced outwardly of the tire.

12. The structure defined in claim 4 in which the bearing members are channel-shaped in cross-section and extend longitudinally beyond the tread members with the cross-tie member attached to the connectors between the sides of the bearing members.

13. A pair of tire engaging bearing members intermediately pivoted one to each side of a traction device constructed and arranged to be placed transversely around a wheel rim and a tire mounted thereon, the bearing members at their outer ends being arranged to engage the wheel rim on opposite sides of the tire and hold the traction device against movement transversely around the tire.

14. A tread device for tire-equipped wheel rims comprising a shackle applicable around the wheel rim and tire, and a bearing member extended in a plane that transversely intersects the wheel rim and tire and connected to said shackle at points intermediate its inner and outer ends.

15. The structure defined in claim 14 in which there are two of said bearing members connected to said shackle as described.

16. The structure defined in claim 14 in which there are two of said bearing members connected to said shackle as described, the faces of said bearing members being made concave so that their inner and outer ends will engage tires varying in cross-sectional diameter.

17. A tread device for tire-equipped wheel rims comprising a shackle applicable around the wheel rim and tire, and bearing members extended in planes that transversely intersect the wheel rim and tire and pivotally connected to said shackle at points intermediate their inner and outer ends.

18. A tread device for tire-equipped wheel rims comprising a shackle applicable around the wheel rim and tire, and bearing members extended in planes that transversely intersect the wheel rim and tire and pivotally connected to said shackle at points intermediate their inner and outer ends, the tire-engaging faces of said bearing members being concave.

HAROLD G. STOKKE.
PETER WORNER.